United States Patent
Yu et al.

(10) Patent No.: US 11,303,659 B2
(45) Date of Patent: Apr. 12, 2022

(54) DETECTING INAPPROPRIATE ACTIVITY IN THE PRESENCE OF UNAUTHENTICATED API REQUESTS USING ARTIFICIAL INTELLIGENCE

(71) Applicant: International Business Machines Corporation, Armonk, NY (US)

(72) Inventors: Xuejie Yu, Kassel (DE); Matthias Bartelt, Kassel (DE); Manuel Hauptmann, Kassel (DE); Ronald Williams, Austin, TX (US); Lidiya Mekbib Tilahun, Kassel (DE); Archana Kumari, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 16/232,337

(22) Filed: Dec. 26, 2018

(65) Prior Publication Data
US 2020/0213336 A1    Jul. 2, 2020

(51) Int. Cl.
*G06F 9/54* (2006.01)
*G06N 3/08* (2006.01)
*H04L 29/06* (2006.01)

(52) U.S. Cl.
CPC ............ *H04L 63/1425* (2013.01); *G06F 9/54* (2013.01); *G06N 3/08* (2013.01); *H04L 63/20* (2013.01)

(58) Field of Classification Search
CPC ........ H04L 63/1425; H04L 63/20; G06F 9/54
See application file for complete search history.

(56) References Cited

U.S. PATENT DOCUMENTS 10,282,241 B1 * 5/2019 Kennedy, Jr. ....... H04L 63/0807
10,565,372 B1 * 2/2020 Stickle .................... G06F 21/55
(Continued)

FOREIGN PATENT DOCUMENTS

| CN | 106650418 | 5/2017 |
| CN | 107315950 | 11/2017 |

OTHER PUBLICATIONS

PCTIB2019/060828, Written Opinion of the International Search Authority, dated Apr. 16, 2020.
(Continued)

*Primary Examiner* — Viral S Lakhia
(74) *Attorney, Agent, or Firm* — Jeffrey S. LaBaw; David H. Judson

(57) ABSTRACT

Unauthenticated client access to an application (e.g., a SaaS-based web application) that employs unauthenticated API endpoints is monitored and protected by an access control system and method that leverages a neural network. The neural network is trained to recognize user behaviors that should be deemed to be "inappropriate" according to a policy. Using the neural network, the system provides effective discrimination with respect to unauthenticated user behavior, and it enables access controls to be more effectively enforced with respect to users that are not using the application according to an enterprise security policy. By training the neural network to recognize pattern(s) behind regular user behavior, the approach enables robust access control with respect to users that are unauthenticated. More generally, the approach facilitates access control based in whole or in part on API interactions with an application where the identity of the individuals making that access are unknown or necessarily ascertainable.

25 Claims, 10 Drawing Sheets

(56) References Cited

U.S. PATENT DOCUMENTS

| | | | |
|---|---|---|---|
| 10,887,333 B1* | 1/2021 | Pereira | G06F 21/55 |
| 11,216,888 B2* | 1/2022 | Perl | G06N 3/08 |
| 2009/0158407 A1 | 6/2009 | Nicodemus et al. | |
| 2012/0317644 A1* | 12/2012 | Kumar | G06F 21/566 |
| | | | 726/24 |
| 2014/0180981 A1 | 6/2014 | Dolev et al. | |
| 2015/0350174 A1* | 12/2015 | Reno | H04L 67/10 |
| | | | 726/3 |
| 2016/0308900 A1* | 10/2016 | Sadika | H04L 63/1416 |
| 2017/0026393 A1* | 1/2017 | Walsh | H04W 4/00 |
| 2017/0206449 A1* | 7/2017 | Lain | G06N 3/04 |
| 2017/0237773 A1* | 8/2017 | Wallace | H04L 63/1475 |
| | | | 726/22 |
| 2018/0018459 A1* | 1/2018 | Zhang | G06F 21/554 |
| 2019/0020665 A1* | 1/2019 | Surcouf | H04L 9/3236 |
| 2019/0102840 A1* | 4/2019 | Perl | G07C 5/02 |
| 2019/0258818 A1* | 8/2019 | Yu | G06F 21/31 |
| 2020/0004963 A1* | 1/2020 | Zheng | G06F 21/566 |
| 2020/0019699 A1* | 1/2020 | Araujo | G06F 21/57 |
| 2020/0026851 A1* | 1/2020 | Dhankha | G06F 21/554 |
| 2020/0042701 A1* | 2/2020 | Yang | G06F 21/566 |
| 2020/0162483 A1* | 5/2020 | Farhady | G06N 3/08 |

OTHER PUBLICATIONS

Adler et al, "Using machine learning for behavior-based access control; scalable anomaly detection on TCP connections and HTTP requests," Raytheon, 2012.

Fielding, "Representational State Transfer," 2000 https://www.ics.uci.edu/~fielding/pubs/dissertation/rest_arch_style.htm.

* cited by examiner

FIG. 8

| Details | | /ipr/:ip/details | WHOIS Record | | /ipr/:ip/whois |
|---|---|---|---|---|---|
| Categorization | ■ Anonymization Services (43%) | 802 | Updated | Sep 21, 2018 | 804 |
| | ■ General Business (leadbox.cz) | | Registrant Name | APNIC Debogon Project | |
| Application | No known application | | Registrant Organization | Debogon-prefix | |
| Location | Australia | | Registrant Country or Region | Australia | |
| | | | Registrar Name | APNIC | |
| | | | Email | research@apnic.net | |

| Category | Reason | Location | Date |
|---|---|---|---|
| ▲ Anonymization Services (43%) | Content found on multihoster | Australia | Jan 31, 2018 2:10 AM |
| /ipr/:ip/categories | Security analyst review | Australia | May 2, 2017 4:09 PM |
| ~~Anonymization Services (43%)~~ | Content found on multihoster | Australia | Jan 14, 2017 8:45 AM |
| ▲ Anonymization Services (43%) | Content found on multihoster | Australia | Aug 19, 2016 6:36 PM |

45 Timeline view all
[show chart]
806

| Name | | Category | Type | Location | Date |
|---|---|---|---|---|---|
| URL | site1.com | Spam URLs | A | | Nov 6, 2018 1:55 PM |
| URL | site2.com  /ipr/:ip/pdns | General Business | A | | Nov 6, 2018 9:21 AM |
| | | | | | First seen 6 months ago |
| URL | site3.com | Brokers/Stock Exchange, Financial Services/ Insurance/ Real Estate, Banking | A | | Nov 5, 2018 10:33 PM |
| | | | | | First seen 2 years ago |
| URL | site4.com | Shopping, Fashion/ Cosmetics/ Jewelry | A | | Nov 5, 2018 6:47 PM |
| | | | | | First seen 6 months ago |

617 Passive DNS view more
808

800

DETECTING INAPPROPRIATE ACTIVITY IN THE PRESENCE OF UNAUTHENTICATED API REQUESTS USING ARTIFICIAL INTELLIGENCE

BACKGROUND

Technical Field

This disclosure relates generally to techniques to detect anomalous or malicious network activities or user behavior, e.g., in an enterprise network.

Background of the Related Art

Enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills. In particular, the ever increasing number of threats at scale requires automation in support of security analysts, who are responsible for preventing, detecting and responding to these threats. In most cases, the analyst must manually search through a wide range of data sources (some private, many public), review past threat events and how they were handled, check for duplicate events, currently open similar events and a knowledge database, etc., to determine an appropriate response procedure to handle this information. This process of data collection, analysis, and determining the final disposition of the alert, is time consuming and tedious for an analyst.

There are a variety of tools that exist for threat monitoring to analyze a wide range of data sources to identify patterns that are indicative of threats, security policy and control anomalies, and that allow enterprises to research, collaborate and act on threat intelligence. One such tool is IBM® X-Force® Exchange, which is a cloud-based threat intelligence platform that allows users to consume, share and act on threat intelligence. With this platform, users can rapidly research the latest global security threats, aggregate actionable intelligence, consult with experts and collaborate with peers. IBM X-Force Exchange, supported by human- and machine-generated intelligence, leverages the scale of IBM X-Force security professionals to help users stay ahead of emerging threats. When these threats and/or anomalies are detected, actionable alerts are created.

Representational state transfer (REST) is a program interface specification consisting of a coordinated set of architectural constraints applied to components, connectors, and data elements, within a distributed hypermedia system. REST ignores the details of component implementation and protocol syntax to focus on the roles of components, the constraints upon their interaction with other components, and their interpretation of significant data elements. Web Service application programming interfaces (APIs) that adhere to the REST constraints are called RESTful. Software-as-a-Service (SaaS)-based applications employing RESTful APIs frequently make APIs available directly to users' browsers via JavaScript applications. Frequently, these APIs are hosted on API servers and are unauthenticated endpoints. Ideally, all endpoints authenticate their users, however, for various reasons an enterprise may be required to deploy non-authenticating endpoints for certain features of the application. If a user discovers and uses an unauthenticated endpoint directly, e.g., through programmatic access to the API, the behavior should be deemed to be inappropriate, even if is technically possible.

Thus, there is a need to identify and implement a usage-based protection mechanism that can differentiate legitimate from illegitimate use, and provide an alternate enforcement mechanism in the absence of authenticated requests.

BRIEF SUMMARY

Unauthenticated client access to an application (e.g., a SaaS-based web application) that employs unauthenticated API endpoints is monitored and protected by an access control system and method that leverages a neural network. The neural network is trained to recognize user behaviors that should be deemed to be "inappropriate" according to a policy.

According to a first aspect of this disclosure, a method for access control in a computing environment in which clients interact with an application at least in part using application programming interface (API)-based requests having one or more unauthenticated endpoints is provided. Runtime operation begins in response to receipt of an API access request from an unauthenticated client. In response, a classifier is applied to the API access request. The classifier is one that has been generated using artificial intelligence, in particular by training a neural network according to a policy to distinguish at least first and second classes of behavior with respect to programmatic access to the one or more unauthenticated endpoints. The first class of behavior is designated in the policy as appropriate activity, and the second class of behavior is designated in the policy as inappropriate activity. Upon a determination by the neural network classifier that the API access request from the unauthenticated client is within the first class of behavior, the API access request is permitted. However, upon a determination by the classifier that the API access request from the unauthenticated client is within the second class of behavior, a given action is taken to ensure compliance with the policy. Thus, for example, the given action may be one of: permitting the API access request, blocking the API access request, initiating an audit operation associated with permitting or blocking the API access request, and blacklisting the unauthenticated client.

Preferably, training the neural network classifier includes defining a feature set comprising a set of elements representing a set of endpoints associated with a particular API access request from a client. An endpoint preferably is defined with respect to a given time window, and wherein the element associated with the endpoint is assigned a value that is a function of whether the hit represents appropriate activity or inappropriate activity. Training data for the neural network includes both positive (policy met) and negative (policy denied) data sets. Preferably, the positive data sets are derived from logs (event records), and the negative data sets are artificially created to simulate policy denied scenarios.

According to a second aspect of this disclosure, an apparatus for access control is described. The apparatus comprises a hardware processor, and computer memory holding computer program instructions executed by the hardware processor to perform a set of operations such as the steps described above.

According to a third aspect of this disclosure, a computer program product in a non-transitory computer readable medium for use in a data processing system for access control described. The computer program product holds computer program instructions executed in the data processing system and operative to perform operations such as the steps described above.

According to a fourth aspect of this disclosure, a software-as-a-service implemented in a network-accessible cloud compute infrastructure comprising hardware and software is described. The service comprises a network-accessible application, a neural network, and a service that facilitates an access control with respect to the application. The neural network is deployed in association with a set of interface endpoints that are accessible by an unauthenticated client seeking access to the network-accessible application. The neural network is trained according to a policy to distinguish at least first and second classes of behavior with respect to programmatic access to the one or more interface endpoints. The service is configured to (i) respond to receipt of a plurality of interface access requests to the network-accessible application, (ii) to apply the neural network to make a determination whether the plurality of interface access requests satisfy a policy context, and (iii) to apply an access control based on the determination.

The approach of this disclosure provides a way to detect inappropriate activity in the presence of unauthenticated API requests or, more generally, unauthenticated users. Using the neural network, the system provides effective discrimination with respect to unauthenticated user behavior, and it enables access controls to be more effectively enforced with respect to users that are not using the application according to the enterprise's security policy. The neural network-based approach provides much more accurate results in dynamic environments as compared to deterministic rules-based solutions, which provide very low coverage. By training the neural network to recognize pattern(s) behind regular user behavior, the approach enables robust access control with respect to users that are unauthenticated. More generally, the approach facilitates access control based in whole or in part on API interactions with an application where the identity of the individuals making that access are unknown or necessarily ascertainable.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 depicts an example scenario wherein a user interface (UI) display comprises a report page consisting multiple distinct report elements, and wherein each of the report elements is obtained from a distinct API server endpoint;

DETAILED DESCRIPTION OF AN ILLUSTRATIVE EMBODIMENT

Figure 1:
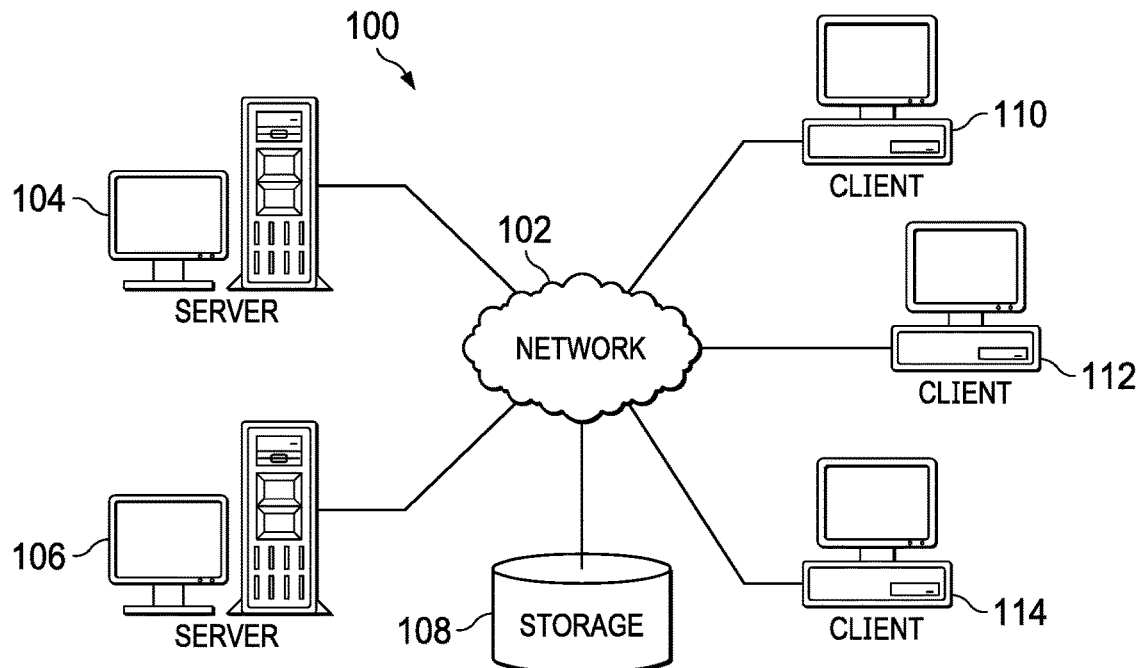
FIG. 1 depicts an exemplary block diagram of a distributed data processing environment in which exemplary aspects of the illustrative embodiments may be implemented.
Figure 2:
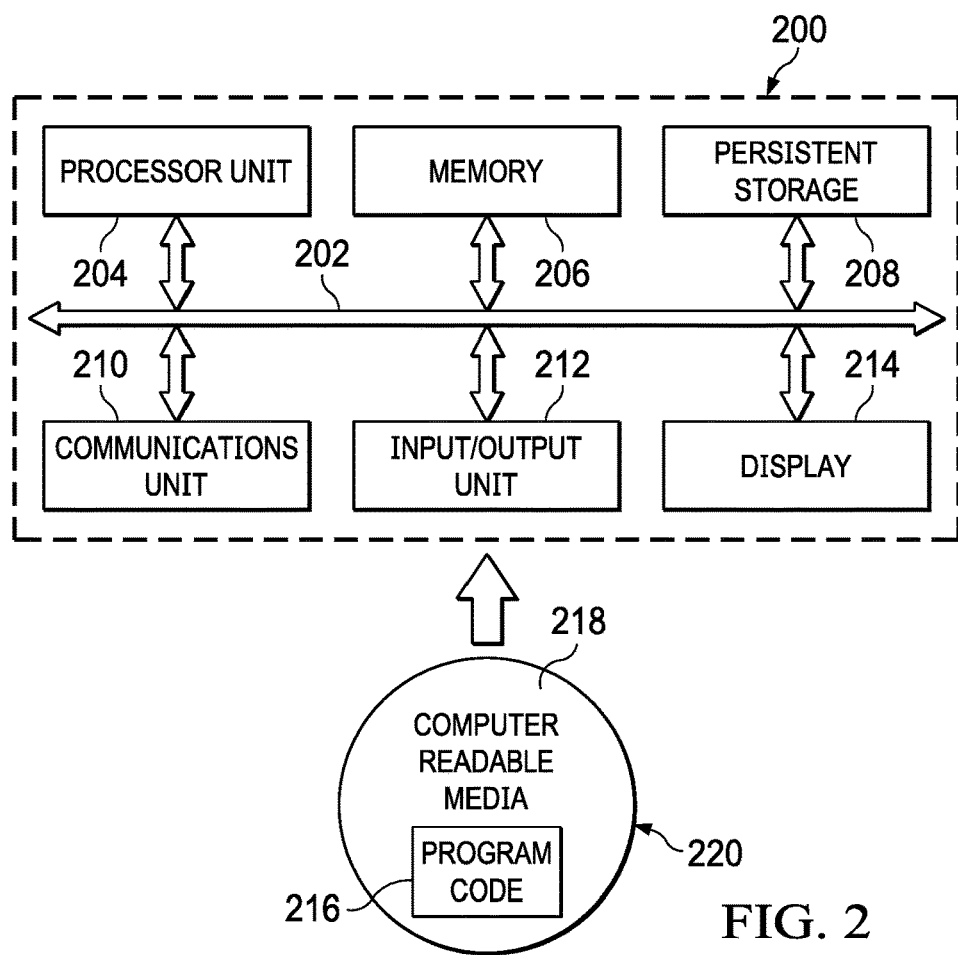
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112 and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, JSON, STIX/TAXII, among others. Information regarding SOAP is available from the World Wide Web Consortium (W3C), which is responsible for developing and maintaining these standards; further information regarding HTTP and XML is available from Internet Engineering Task Force (IETF). Familiarity with these standards is presumed.

RESTful Application Programming Interface (API)

Representational state transfer (REST) is a program interface specification consisting of a coordinated set of architectural constraints applied to components, connectors, and data elements, within a distributed hypermedia system. REST ignores the details of component implementation and protocol syntax in order to focus on the roles of components, the constraints upon their interaction with other components, and their interpretation of significant data elements. Web Service application programming interfaces (APIs) that adhere to the REST constraints are called RESTful. RESTful APIs are defined using aspects such as a uniform resource identifier (URI), an Internet media type for the data (e.g., often JavaScript Object Notation (JSON), but it can be any other valid Internet media type.), standard HTTP commands, also called methods (e.g., GET, PUT, POST, or DELETE), hypertext links to reference state, and hypertext links to reference related resources.

A concept in REST is the existence of resources (sources of specific information), each of which is referenced with a global identifier (e.g., a uniform resource identifier (URI) in Hypertext Transfer Protocol (HTTP)). To manipulate these resources, components of the network (e.g., user agents, origin servers etc.) communicate via a standardized interface (e.g., HTTP) and exchange representations of these resources (which are often documents conveying the representation).

Any number of connectors (e.g., clients, servers, caches, tunnels, etc.) can mediate the request, but each does so without "seeing past" its own request (referred to as "layering", another constraint of REST and a common principle in many other parts of information and networking architecture). Thus, an application can interact with a resource by knowing two things: the identifier of the resource and the action required. The application does not need to know whether there are caches, proxies, gateways, firewalls, tunnels, or anything else between it and the server actually holding the representation. The application does, however, need to understand the format of the returned representation, which is typically a type of Hyper Text Markup Language (HTML), Extensible Markup Language (XML), or Java®. Script Object Notation (JSON), an object-oriented language, or document format, although the returned information may be an image, plain text, or any other format.

In known solutions, and to provide a RESTful interface for an application, a developer writes code to process HTTP requests received by a HTTP application server. Such code includes instructions to execute the following steps: (1) translate the embedded REST request and data in a data-interchange format (e.g., data in a language-independent data format such as JavaScript Object Notation (JSON) or Extensible Markup Language (XML)) representation into programmatic format (e.g., a C++ data type) as input parameters of a function; (2) dispatch the request to the API of the appropriate application with the input parameters of the function; (3) translate any output data into a data-interchange format, such as JSON; (4) assemble the response, such as an HTTP response; and (5) send the response to the client.

To use a RESTful interface in a programmatic manner as a client, e.g., in a script, a user needs to perform the following steps: (1) translate any input data into a data-interchange format, such as JSON; (2) assemble a request, such as an HTTP request, with the input data; (3) send the request to application server; (4) receive a response from application server; and (5) translate the embedded response data, often in JSON, into script objects or variables for further processing.

Security Intelligence Platform with Incident Forensics

Figure 3:
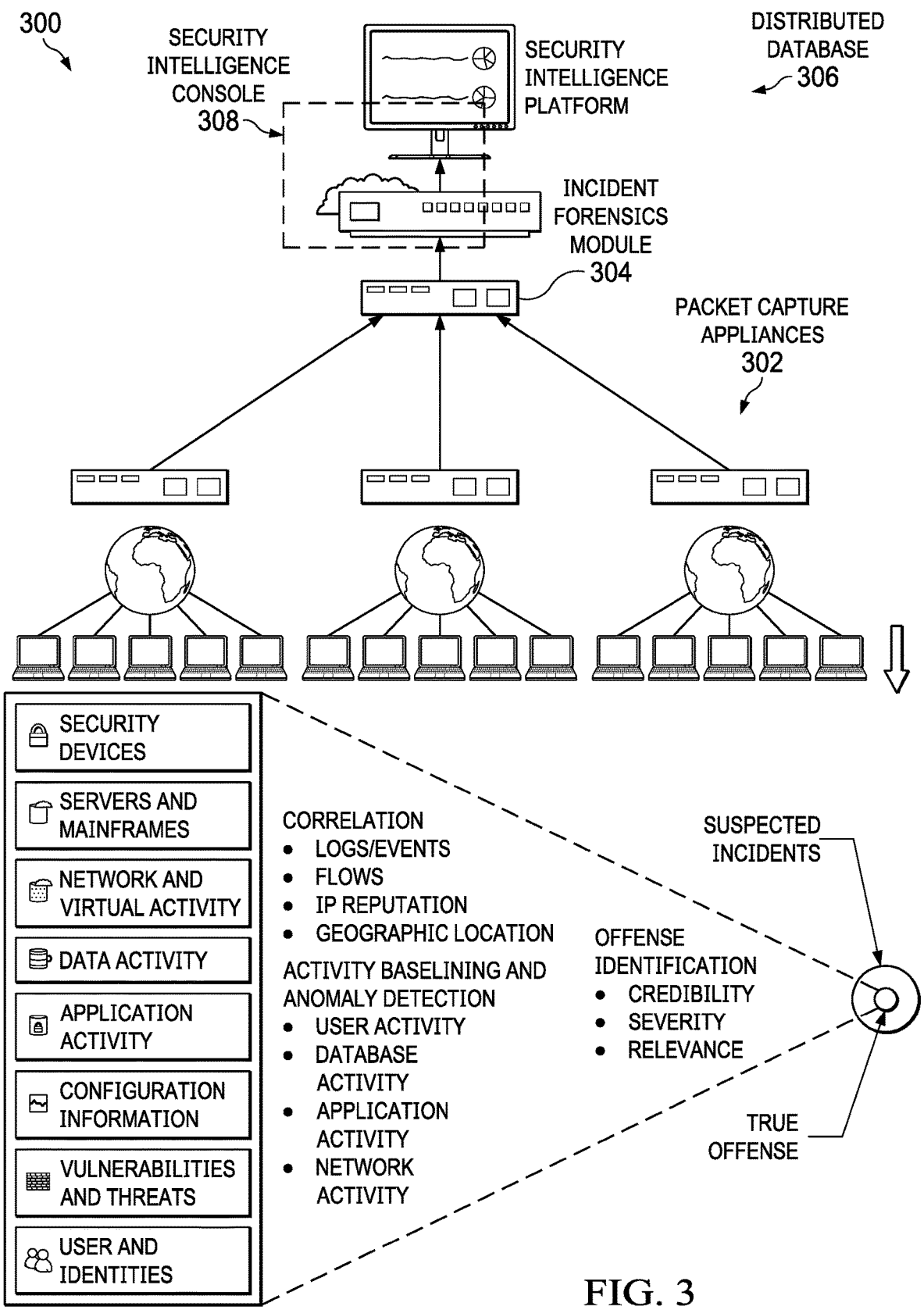
FIG. 3 illustrates a security intelligence platform in which the techniques of this disclosure may be practiced.

A known type of enterprise-based security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a dashboard to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. It is designed to be a sealed and secure environment with limited accessibility and then only be authenticated and authorized individuals.

An appliance of this type can facilitate Security Information Event Management (STEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications.

Figure 4:
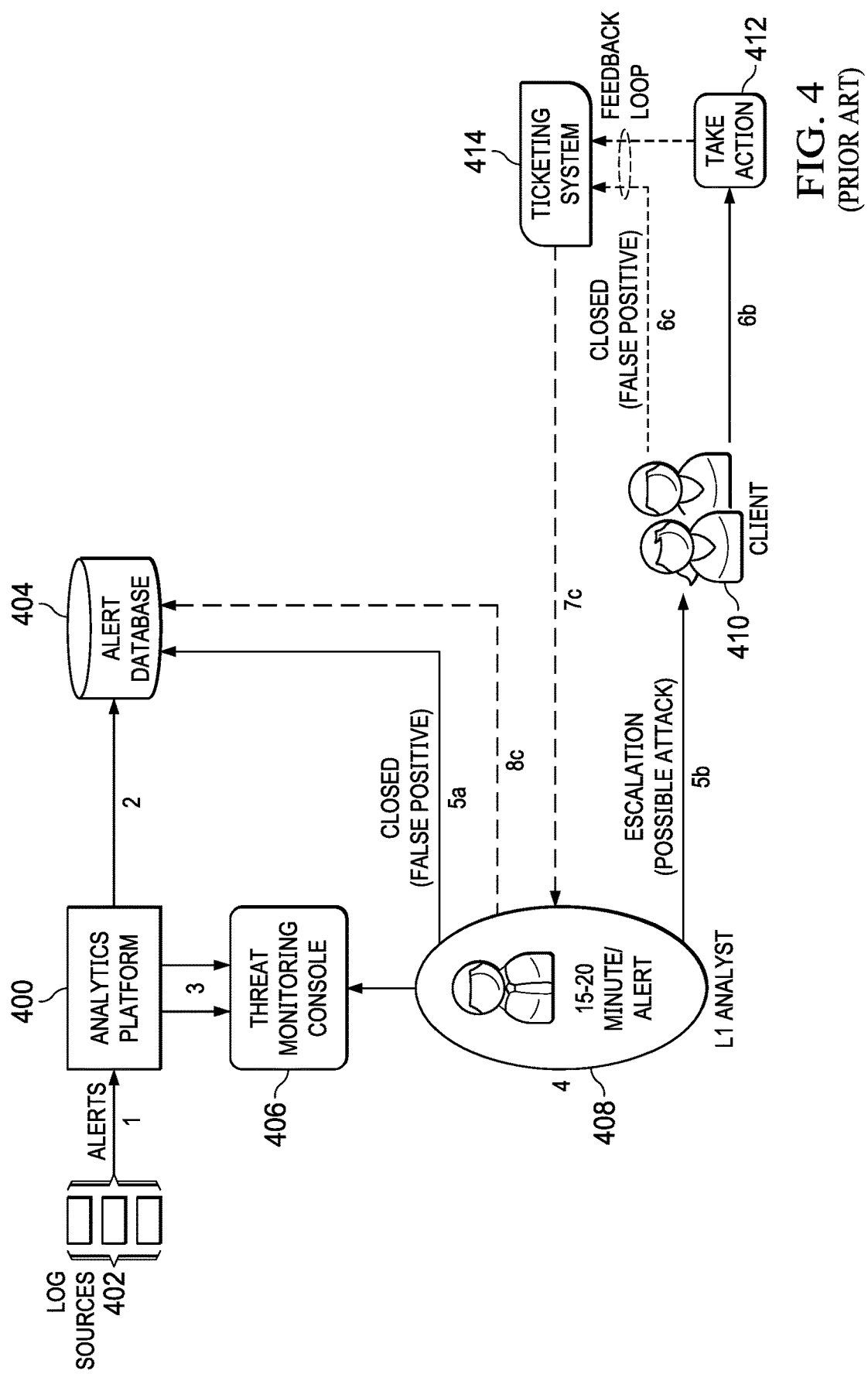
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(*a*)) as a false positive, or escalation the alert (step 5(*b*)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

Cloud Computing Model

As will be described, the techniques of this disclosure preferably leverage computing elements that are located in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In a typical cloud computing environment, a set of functional abstraction layers are provided. These include a hardware and software layer, a virtualization layer, a management layer, and a workload layer.

The hardware and software layer includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer provides the functionality for which the cloud computing environment is utilized.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Cloud-Based Threat Intelligence

As noted above, there are a variety of tools that exist for threat monitoring to analyze a wide range of data sources to identify patterns that are indicative of threats, security policy and control anomalies, and that allow enterprises to research, collaborate and act on threat intelligence. One such tool is IBM® X-Force® Exchange, which is a cloud-based threat intelligence platform that allows users to consume, share and act on threat intelligence. This platform is hosted in a cloud computing environment as described above and exposed to enterprise users in a Software-as-a-Service (SaaS) model. More generally, this service provides a cloud-based threat intelligence sharing platform enabling users to rapidly research the latest security threats, aggregate actionable intelligence and collaborate with peers.

In particular, IBM X-Force Exchanges provides an open platform that adds context to indicators of compromise (IOC) with a mix of human-and machine-generated insights. It offers timely threat intelligence that is dynamically updated. The software delivers web threat monitoring of billions of web pages and is supported by a database of a large number of vulnerabilities. It offers deep intelligence on millions of spam and phishing attacks and monitors reputation data with malicious IP addresses. The platform facilitates collaboration by enabling users to connect with industry peers to validate findings, share a collection of IOC to aid in forensic investigations, or add context to threats through peer collaboration via private groups and shared collections. The solution is designed for third-party integration with support for Structured Threat Information Expression (STIX) and Trusted Automated Exchange of Indicator Information (TAXII), which are the established standards for automated threat intelligence sharing. It allows for integration between IBM Security products and X-Force Exchange-sourced actionable intelligence. An Application programming interface (API) is provided to enable enterprises to connect threat intelligence to security products. Using the platform, enterprises can research indicators of compromise, conduct security investigations and watch for vulnerabilities on target technologies in their infrastructure, typically just by maintaining a list of keywords or products to monitor. If new vulnerabilities are disclosed that match keywords or products on a watchlist, automatic notifications are provided. To help take action on these vulnerabilities, the enterprise simply adds them to a Collection and import it into a SIEM, either via the API or using STIX/TAXII protocols. In addition, a Threat Feed Manager within X-Force Exchange simplifies the task of getting data out of various sources and into one view. These third-party threat intelligence sources can be enabled directly on the platform by providing the credentials for those providers, and the platform will then integrate the data into X-Force Exchange directly. The latest threat intelligence research, in the form of new intelligence for malware campaigns and new threat vectors, are added to the platform continuously via public Collections. These collections are curated by X-Force security experts to add human context to indicators of compromise on the platform. Details include TLP ratings, timeframes, target regions, campaign details and links to related references to learn more. Users can follow the collection to be notified of updates as new information becomes available.

The above-described commercial service is identified for explanatory purposes only, as the technique of this disclosure is not limited for use with this service.

Detecting Inappropriate Activity in the Presence of Unauthenticated API Requests Using AI With the above as background, the technique of this disclosure is now described.

Figure 5:
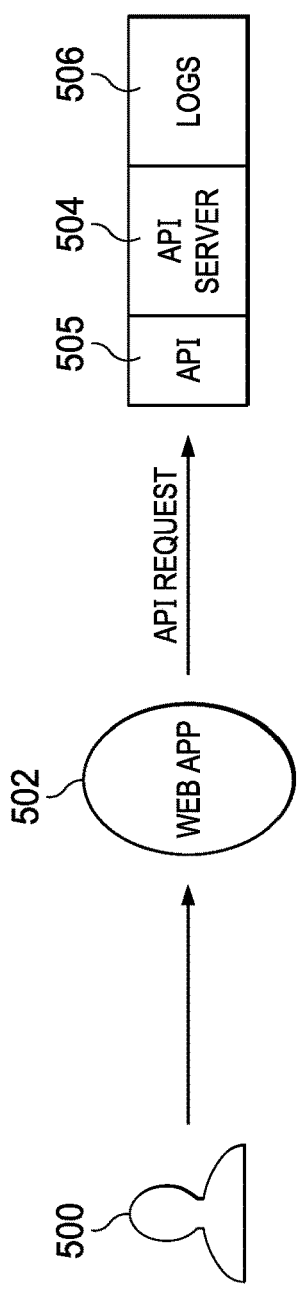
FIG. 5 depicts a representative operating environment wherein end users are interacting with a Software-as-a-Service (SaaS)-based web application that employs RESTful APIs, and in which the technique of this disclosure may be implemented.

The basic operating environment is depicted in FIG. 5. As depicted, end users 500 are interacting with an application (e.g., a Software-as-a-Service (SaaS)-based web application 502), which is application that employs APIs (e.g., RESTful APIs 505). The APIs typically are supported by an API server 504, and they are available directly to users' browsers, typically via JavaScript applications. API access requests are monitored and stored as log data 506. Frequently, one or more APIs as hosted on the API server 504 as unauthenticated endpoints, meaning that they can be accessed and used (via API requests) by users whose identities are unknown. Ideally, all endpoints authenticate their users, however, for various reasons an enterprise may be required to (or simply may otherwise) deploy non-authenticating endpoints for certain features of the application. As noted above, this presents a security vulnerability for the system. If and when a user discovers and uses an unauthenticated endpoint directly, e.g., through programmatic access to the API, the behavior should be deemed to be inappropriate, even if is technically possible.

Figure 6:
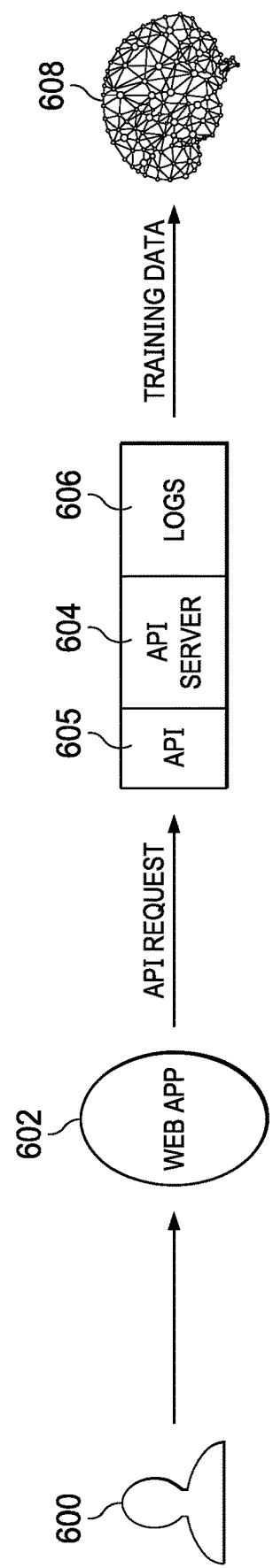
FIG. 6 depicts the operating environment in FIG. 5 that has been augmented to incorporate artificial intelligence, e.g., a neural network that is trained to discriminate appropriate versus inappropriate behavior originated by unauthenticated clients and that use API requests.

As will be described, and as depicted in FIG. 6, the technique of this disclosure leverages artificial intelligence (AI) to detect such inappropriate activity in the presence of unauthenticated API requests. As depicted, end users 600 are interacting with SaaS-based web application 602 that employs RESTful APIs 605 supported by API server 604, with access data being logged 606. As also depicted, the approach herein augments the above-described operating environment by employing artificial intelligence, preferably in the form of a neural network (NN). As depicted, in this approach, a neural network (NN) classifier 608 is incorporated and trained on the log data 606, as well as data that is generated by the system to simulate access requests that violate a policy (e.g., a set of "terms and conditions" associated with access to the web application). Thus, in general, and for data collection, when the users 600 use the web application 602, the API requests sent to the API server 604 are logged out in files 606, and the logs are processed by the training methodology (as described in detail below) to construct training data for the neural network 608.

Thus, according to this disclosure, a neural network classifier is trained (e.g., on access logs and other data) that reflect "appropriate" and "inappropriate" behavior as determined by a policy. Typically, what constitutes appropriate or inappropriate behavior is enterprise-specific, and an enterprise configures a security policy to identify particular user behavior that should be characterized one way or the other, trains the neural network accordingly, and then instantiates the trained neural network to be queried (e.g., on each access request) to determine whether the request is deemed appropriate or inappropriate. The determination by the neural network (that a particular request is appropriate or inappropriate) then is used to facilitate an access control decision, all as will be described in more detail below.

According to this approach, the following rationale is leveraged. In particular, unauthenticated API requests accessing API endpoints directly and initiated by the user in the "context" of the web application preferably are defined as appropriate user behavior, whereas unauthenticated API requests accessing these endpoints directly but initiated outside of that context are defined as inappropriate. The labels "appropriate" or "inappropriate" are not intended to be limited. What constitutes the "context" of the application is dependent on the type of application and the user API request behavior in particular. In one non-limiting example, the API application is a web-based user interface (UI) that displays a report page comprising multiple distinct report elements, each of which is obtained in the UI from distinct API-accessible endpoints. The user experience is that the entire page is rendered in the browser. When user behavior is legitimate, a page controller calls the content endpoints for each page element to render that section (and thus all sections of the page), but these calls (if the overall activity is legitimate) occur in close time proximity with one another. Individual access requests that do not exhibit such timing are not within the "context" expected (in this example a UI application endpoint association) and thus are deemed inappropriate.

Figure 7:
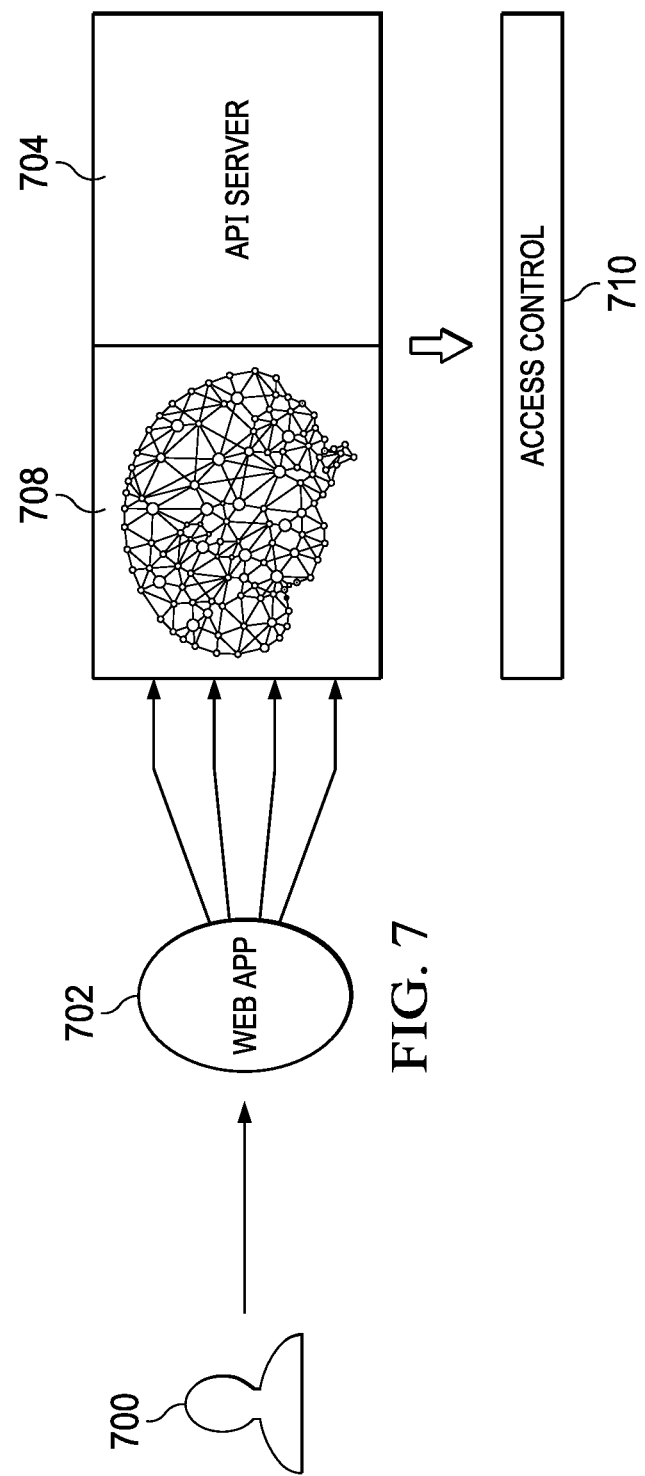
FIG. 7 depicts the neural network implemented as a middleware layer to provide a prediction regarding whether a particular unauthenticated user activity is appropriate or inappropriate.

Once the neural network is trained to recognize appropriate or inappropriate behavior (given the particular application, the enterprise policy, and the associated context-based behavior(s)), the neural network is deployed, preferably as middleware on the API server. This arrangement is depicted in FIG. 7, which shows the API server 704 incorporating the neural network 708 as a middleware layer through which API requests are then processed. When users 700 browse the web application 702, unauthenticated API requests (associated with some activity) preferably are collected over a given time range (e.g., one second) and then translated into a feature set that is input to the neural network 708. Based on its training, the neural network 708 makes a prediction regarding whether unauthenticated API access requests (e.g., page element endpoints accessed in close time proximity with one another to build a UI report page) associated with that user activity represent legitimate user behavior (or not), and it outputs an assessment accordingly. The prediction is then supplied to an access control system or method, which is represented by block 710. The particular type and/or operation of the access control system or method 710 is not a limitation. Typically, the access control has a number of primary actions (e.g., permit, deny, audit, etc.) that are implementation-specific.

Stated another way, the approach herein uses the neural network as a decision point (typically with respect to some access control method or system) for activity—typically unauthenticated API access requests) initiated by unauthenticated clients/end users. As noted above, and in one embodiment, the assessment is binary and, in particular, that a given activity (and its associated API access requests) is—with respect to a policy—appropriate or, instead, inappropriate. Although the neural network classification typically is binary, this is not a limitation, as there may be multiple classifications (e.g., appropriate, inappropriate, indeterminate, etc.).

Generalizing, and according to this disclosure, a neural network classifier is trained according to a policy to distinguish at least first and second classes of behavior with respect to programmatic access to the one or more unauthenticated endpoints. The first class of behavior is designated in the policy as appropriate activity, and the second class of behavior is designated in the policy as inappropriate activity. Once trained, the neural network is then used to facilitate an access control operation. To that end, and responsive to receipt of an API access request from an unauthenticated client, the neural network classifier is applied to the API access request. Upon a determination by the neural network classifier that the API access request from the unauthenticated client is within the first class of behavior, the API access request is allowed (permitted). Upon a determination by the neural network classifier, however, that the API access request from the unauthenticated client is within the second class of behavior, a given action is then taken. The nature of the given action is dependent on the policy; representative actions include, without limitation, blocking the API access request, auditing the API access request, and blacklisting the unauthenticated client.

Thus, the approach herein preferably leverages inbound API analysis in the presence of unauthenticated API requests to train the neural network. Typically, the feature set used to train the neural network is comprised of individual API endpoints, and the identity of these endpoints is context-dependent (namely, based on the particular user behavior sought to be discriminated).

Figure 9:
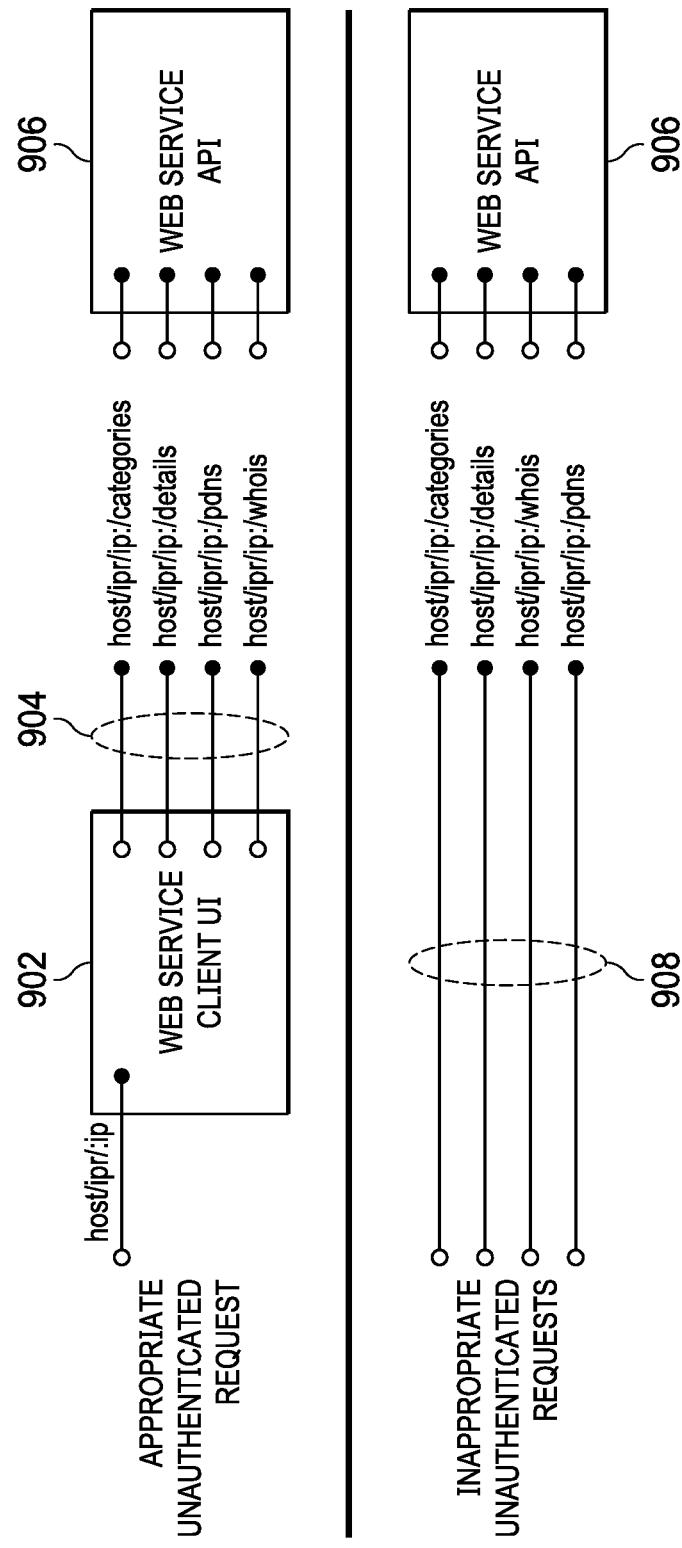
FIG. 9 depicts several unauthenticated request flows for the UI display elements in FIG. 8, with the upper portion representing an appropriate flow, and the lower portion representative an inappropriate flow.

FIG. 8 depicts an example scenario, which is not intended to be limiting. FIG. 8 in particular depicts a user interface (UI) display 800 comprising a report page comprised of multiple distinct report elements 802, 804, 806 and 808. In this example, each of the report elements is obtained from a distinct API server endpoint. Thus, the details section 802 is obtained from an API request to . . . /ipr/:ip/details, the WHOIS record 804 is obtained from an API request to . . . /ipr/:ip/whois, the category section 806 is obtained from an API request to . . . /ipr/:ip/categories, and the passive DNS data is obtained from an API request to . . . /ipr/:ip/pdns. In this example, a page controller (e.g., a JavaScript executed in the client browser) calls the content endpoint for each page element to render that section. This basic operation is depicted in the upper portion of FIG. 9, which depicts an appropriate unauthenticated request to the web service client UI 902, and the follow-on or associated requests 904 to the web service API 906. An "appropriate" unauthenticated request to the page thus contains the individual access requests to the page element's endpoints in close time proximity to one another. In contrast, one or more "inappropriate" requests 908 are depicted in the lower portion of the drawing, as these requests are provided to the web service API 906 without being time proximate to any request for the page itself. Stated another way, in this example individual user requests that are time proximate (the upper portion of the drawing) to associated UI application endpoints are deemed appropriate, whereas individual user request events not exhibiting UI application endpoint association are deemed inappropriate. As noted above, the particular definition regarding what is or is not appropriate behavior is application- and context-dependent, typically as determined by the policy.

In the example embodiment, individual users are unauthenticated and are typically identified merely by a data set such as {source IP address, user-agent, and accept-language}, typically as that data is provided in an event series (log data). In this sense, the unauthenticated user is sometimes referred to herein as a logical user, with the data set comprising a logical user identifier for the unauthenticated user. As noted above, and in one embodiment, the neural network is trained to identify whether a particular unauthenticated request (namely, a request associated with such a data set) is sufficiently proximate to other events (that together define a context (behavior) of interest). A positive determination may then be output or translated into an "allow" or "permit" operation, whereas a negative determination may be output or translated into a "block" or "audit" operation or the like.

Figure 10:
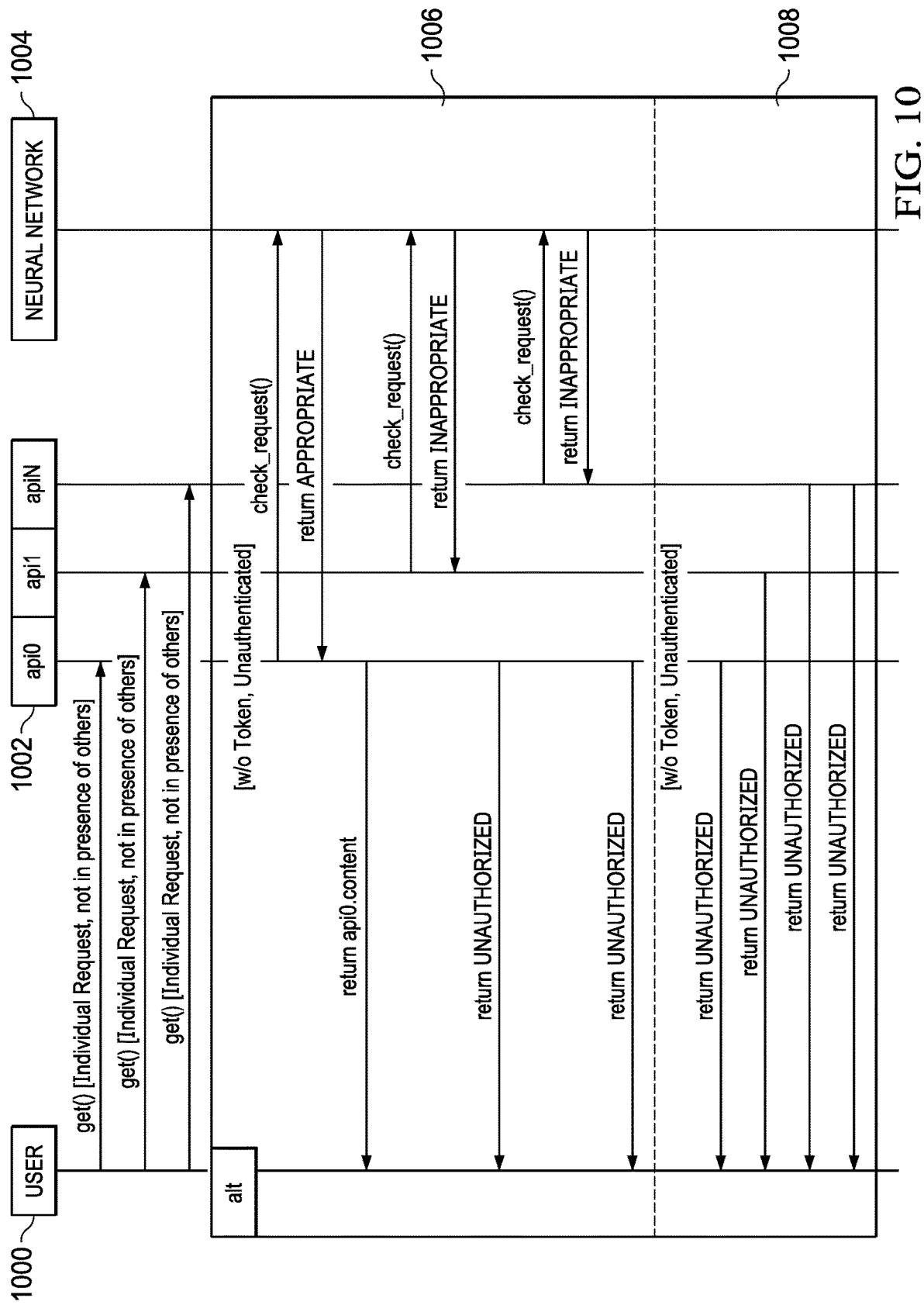
FIG. 10 depicts a representative request-response workflow in an API unauthenticated API access control method with respect to the UI display elements shown in the lower portion of FIG. 9.

FIG. 10 depicts a representative request-response workflow in an API unauthenticated API access control method of this disclosure. In this example, which corresponds to the lower portion of FIG. 9, unauthenticated client/user 1000 makes a set of API access requests directed to a set of APIs 1002 (namely, api0, api1, . . . , apiN), but the individual requests are not made in the presence of other requests, i.e., they do not satisfy the requisite policy context for the behavior. As also depicted, the system includes a neural network 1004 that has been trained to provide a binary classifier to facilitate the access control. In this example, there are two (2) possible scenarios depicted, a first operating scenario wherein the user browser has received a token, and a second operating scenario wherein the user has not received a token. A token may be generated by the cloud environment, the web application or some associated mechanism. The token does not imply that the client/user is necessarily authenticated. In the first scenario, the inclusion of the token enables the initial request (to api0) to be acted upon as appropriate as determined by NN 1004, wherein the associated requests are then found by NN 1004 to be inappropriate. This operation is shown at 1006. When the token is not presented, however, all requests are deemed by the NN 1004 to be inappropriate, and no return of the requested content elements is permitted. This operation is shown at 1008.

The following describes a representative training method for the neural network. This training assumes that events are collected from the SasS-based web application, typically in the form of logs from a SIEM, or from some other logging mechanism, as described above. Preferably, the logs are first analyzed to identify events corresponding to the direct, individual access to one or more sensitive endpoints. Continuing with the example scenario above, these would be the events (e.g., drawn from an "abnormal" log) seeking individual control elements as opposed to the overall UI display page itself. The training preferably then is performed with two sets of data, a first set corresponding to live data representing positive indicators (i.e., where the individual requests were found to be appropriate), and a second set corresponding to simulate data representing negative indicators (i.e., where a collection of individual request are simulated to represent a policy "denied" situation because such requests are deemed to be inappropriate). In other words, preferably the "positive" indicators are derived from actual traffic, whereas the "negative" indicators are simulated. The negative indicators (resulting in a policy "denied" outcome) may also be drawn from actual traffic (logs), although the preferred approach is to simulate these outcomes for training purposes. To that end, a web scraper routine is provided to simulate the user that scripts or writes software to fetch data directly from individual endpoints, typically in violation of the application's policy (e.g., as set forth in some "terms and conditions"). These operations can be implemented, e.g., using a CURL script that repeatedly calls a single endpoint but in the absence of other calls to associated endpoints that would be otherwise expected to be called if the behavior were appropriate. In other words, the CURL script implements an activity that violate the policy context.

To train the neural network, preferably the user behavior is defined as a bucket containing all API requests initiated by a single user within an (arbitrary) time, e.g., a one (1) second window. A feature set for the neural network is then comprised of an array the length of which is a number of elements in the feature set of zeroes (0s) and ones (1s). A one indicates the associated endpoint is hit, and a zero indicates that no hit is recorded. A positive feature vector, such as [1101000000000], indicates that the legitimate behavior hits three (3) different endpoints. A negative feature vector, such as [1000000000000], indicates that the illegitimate behavior hits only one data endpoint. The training data preferably comprises a matrix with buckets as rows, together with a label [1,0] indicating legitimate behavior, and the label [0,1] indicating illegitimate behavior. Once the neural network is trained, as noted above it is then instantiated in the API request-response workflow. When the user thereafter interacts with the application, one or more requests are collected into buckets with the time range used for the training, translated into feature set(s), and then applied as the input for the neural network. In operation, the neural network provides one of these two assessments, namely, either [1,0] or [0,1] when the binary classification is used. In a representative use case, with [1,0] as the assessment (prediction), all the requests are processed properly. With [0,1] as the assessment, however, the request(s) (or some of them) are rejected. In addition, depending on how the access control is implemented, other actions may be taken. Thus, for example, the user may be added to a temporary blacklist with the result that all subsequent API requests therefrom are rejected as well.

Thus, according to this disclosure, training the neural network classifier includes defining a feature set comprising a set of elements representing a set of endpoints associated with a particular API access request from a client. An endpoint of interest preferably is defined with respect to a given time window, and wherein the element associated with the endpoint of interest is assigned a value that is a function of whether the hit represents appropriate activity or inappropriate activity. Feature sets are combined/aggregated into a matrix, and the output assessments are assigned to each vector (a row in the matrix). In this manner, the neural network captures timing variations among the API access requests in a much more-nuanced manner than can be achieved using rules-based or other deterministic approaches. The resulting access control that leverages this artificial intelligence then is much more fine-grained.

Figure 12:
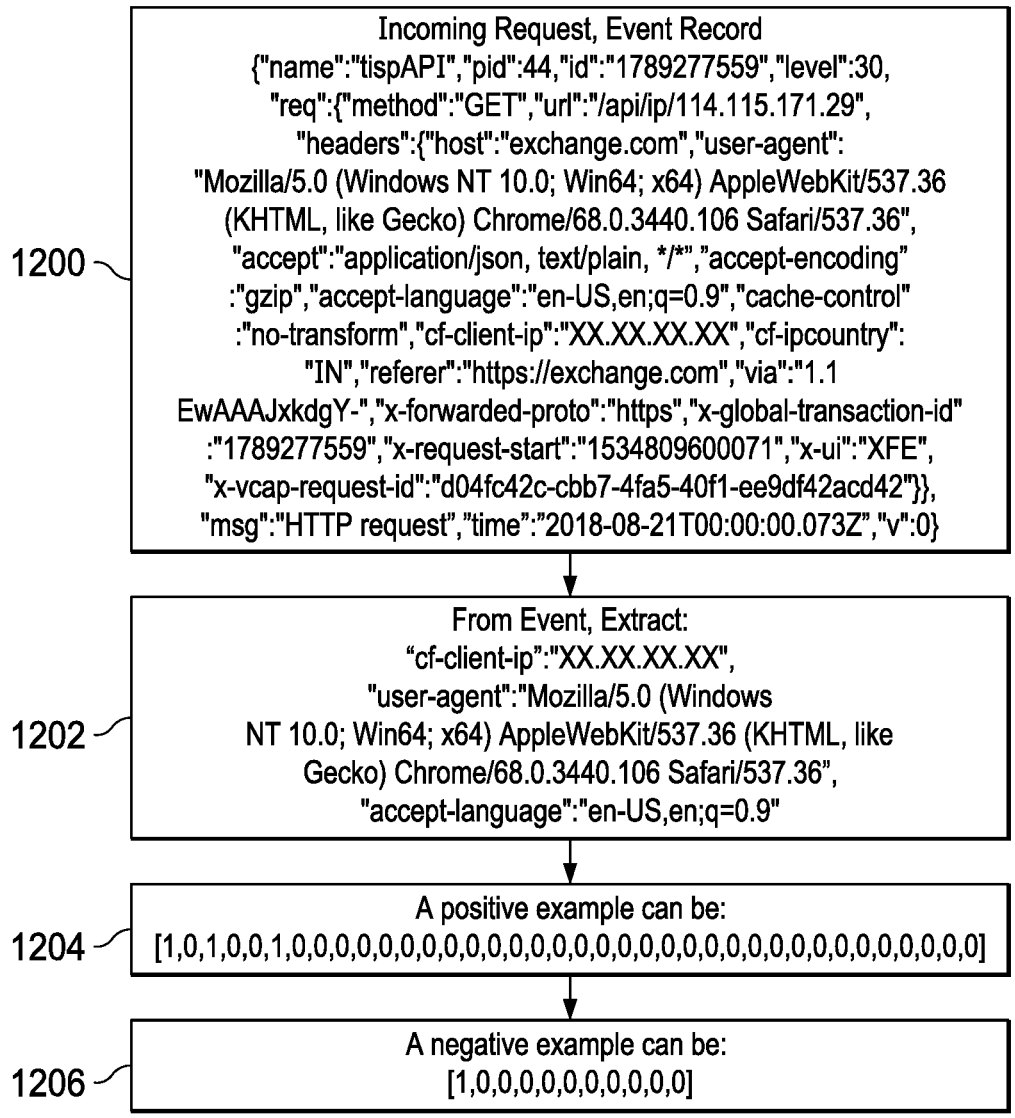
FIG. 12 depicts a representative log record event record that is used to mine positive and negative feature sets to train the neural network in one embodiment.

FIG. 12 depicts a representative example of how training data is used to generate the positive and negative feature sets. Typically, the information obtained from the log is an event record. A representative incoming request has an associated event record 1200 such as shown. To facilitate generating the training data set, and as described above, preferably the client IP address, user-agent and accept-language values are extracted from the event record. The result is depicted at 1202. Then, preferably the web scraper routine uses the extracted information to generate two requests from the same user (a logical user) within the time window; with the full list of endpoints for comparison (to the information fields in the event record 1200), a positive feature set 1204 is created (in this example, as [10100000 . . . 00] with "1" mapped to the endpoint hit for "ip/" and "url/." A negative feature set 1206 may then be [10000000 . . . 00] representing an artificially-created policy denied operation that is applied to the neural network for the training. Thus, in one embodiment, the training system uses information from an actual incoming request event record to generate both the (real) positive feature set, as well as the (artificial) negative feature set. As noted, this approach of creating negative examples (policy-denied) using artificial examples enables the system (via the web scraper routine) to generate useful training data, in effect to balance out the positive feature training data and thus that the neural network is trained sufficiently (and so as to avoid bias).

Figure 11:
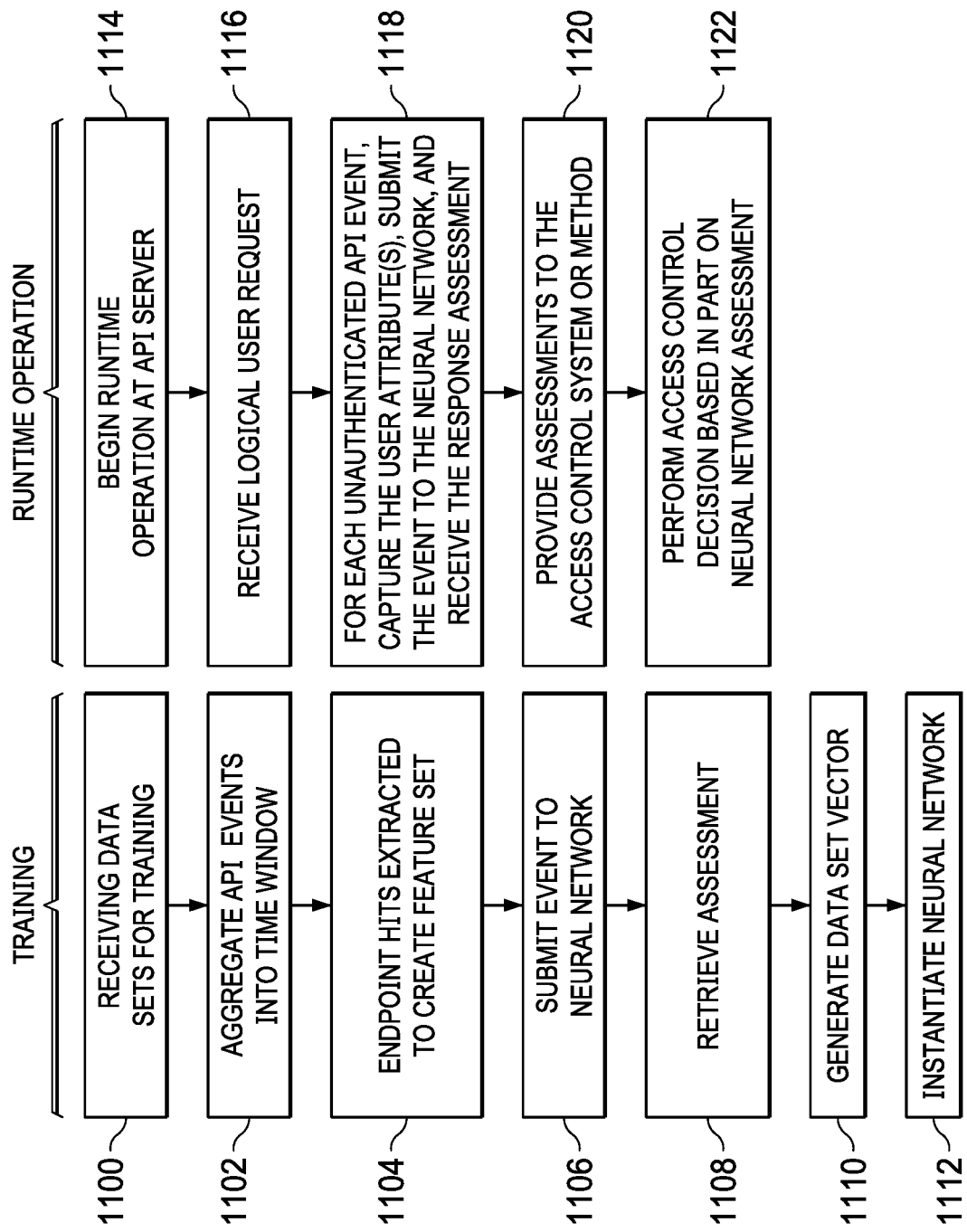
FIG. 11 depicts a process flow of a training method for the neural network.

FIG. 11 is a process flow diagram representing the end-to-end operation of a system that includes the above-described methodology. The training begins at step 1100 by receiving the simulation data set (negative indicators), and the live data set (positive indicators). At step 1102, the API events are aggregated into a time window of interest (e.g., one (1) second) based on the user identifiers. At step 1104, the endpoint points (e.g., API URL) are extracted to create a feature set. At step 1106, an event (in a feature set) is submitted to the neural network. Preferably, an event (in a feature set) is submitted to the neural network together with a predefined class ([0,1] or [1,0]) in order to enable supervised learning. In other words, training is carried out by providing both feature and label to the neural network. At step 1108, the neural network response (appropriate/inappropriate) is retrieved for the event submitted at step 1106. Steps 1106 and 1108 are repeated until all of the relevant API events in the time period are processed, and the resulting vector is generated at step 1110.

In the example scenario in FIG. 8, for each UI component composed of multiple endpoints, the routine identifies each endpoint required (/a, /b, . . . ), compares each endpoint against an application endpoint list, and derives the feature set [ep0, ep1, . . . , epN], wherein each endpoint element is a "1" (present) or "0" (not present). This processing is repeated for the training data to complete the supervised learning-based training of the neural network. At step 1112, the matrix and the associated row-based assessments (for each vector) are instantiated. While the above-described training approach is preferred, other training techniques, e.g., based on unsupervised learning, may be utilized.

A runtime operation begins at step 1114, e.g., with the neural network (as trained in steps 1100 through 1112) being implemented in association with the API server. At step 1116, a logical user request is received. As noted above, typically the logical user request is an identifier comprising a concatenation of user attributes, e.g., IP address (source IP), user-agent, and accept-language. Other data, such as a timestamp, may be included. At step 1118, and for each unauthenticated API event, the runtime routine captures the user attributes, submits the event to the neural network, and receives the response assessment. At step 1120, the response assessment(s) are then provided to the access control method or system. At step 1122, the access control action is carried out to complete the processing.

Without limitation, the access control may be implemented in a policy decision point (PDP) and/or policy enforcement point (PEP). Typically, a policy decision point (PDP) responds to a policy query received from the policy enforcement point (PEP) to enforce a policy on a subject and with respect to a particular action initiated by the subject. The PDP implements the policy decision. In one commercial implementation, the PDP is implemented in a runtime security service, and the PEP is implemented as a plug-in to an application server, such as IBM WebSphere® Application Server.

As noted above, the neural network classifier may be trained and instantiated for use in or in association with the API server. As additional training data is logged and/or simulated, as the case may be, the neural network may be updated, or a new version thereof instantiated to provide updated or otherwise enhanced predictive capability.

The technique herein provides significant advantages. In general, the approach provides a way to detect inappropriate activity in the presence of unauthenticated API requests or, more generally, unauthenticated users. Using the neural network, the system provides more effective discrimination with respect to unauthenticated user behavior, and it enables access controls to be more effectively enforced with respect to users that are not using the application according to the enterprise's security policy. The neural network-based approach provides much more accurate results as compared to rules-based deterministic solutions (even those based on sliding windows) that provide very low coverage especially in dynamic environments. By training the neural network to recognize pattern(s) behind regular user behavior, the approach enables robust access control with respect to users that are unauthenticated. More generally, the approach facilitates access control based in whole or in part on API interactions with an application where the identity of the individuals making that access are unknown or necessarily ascertainable.

While the approach is particular useful in association with RESTful APIs, this is not a limitation. Indeed, the technique is not limited to an API, as the approach here may be generalized to any interface that exhibits protocol- or protocol-like behavior (e.g., an SDK, a generic API, a proprietary API, embedded software that provides transaction definitions, a network interface, a firewall, any other type of API that employs an accessible access control policy, and the like). While the approach is particular useful in association with RESTful APIs, this also is not a limitation. Further, there is no requirement that the technique be implemented in associated with requests to a web application; the target of the client requests may be any application, resource or other network accessible-service.

The neural network may be trained initially, and then updated periodically, continuously, or upon a given occurrence or event.

In a preferred embodiment, the neural network is a feed-forward based neural network (e.g., a two-layer) neural network with one hidden layer and one output layer. The size of the input of the neural network typically corresponds to the size of the endpoint list. Thus, e.g., if there are 38 endpoints, there will be 38 input nodes. The hidden layer will include a number of nodes that typically corresponds to the number of distinct "contexts" for which the network is being trained to discriminate. Thus, e.g., there may 20 nodes in the hidden layer, representing those contexts. The output layer typically includes just two output nodes, corresponding to the appropriate or inappropriate output determination. The neural network uses an activation function (e.g., rectifier, wherein units therein are rectified linear units (ReLUs)). A smooth approximation to the rectifier is an analytic function that has a gradient (e.g., softmax) useful in the output layer. When the training data is feed to the neural net, preferably a stochastic gradient decedent method is used in the training process. The loss function is defined as Mean Square Error (MSE).

Although a neural network is preferred, other types of artificial intelligence (machine learning) may be used. One other type of AI is regression based on complex curves.

In one embodiment, the neural network is hosted in the cloud compute infrastructure.

The particular type and location of the access control system or method may vary. A typical location is the cloud compute environment, but this is not a requirement.

The web application may be hosted at an application or web server, which in turn may be cloud-based.

In a shared tenant environment, it is anticipated that enterprises operate distinct web applications, and thus a particular tenant is anticipated to have a neural network classifier that is uniquely trained (on its data) and that is tuned to its particular policy-based requirements. The cloud service, however, may provide neural network training "as-a-service" on behalf of multiple tenants, each having their respective web applications otherwise hosted in the cloud compute environment.

The artificial intelligence-based system herein provides significant advantages. Using a neural network trained in the manner described, the approach enables robust detection of abnormalities exhibited in network activities or user behavior. The approach is fine-grained, efficient, and scalable, and it is readily adapted to changes in the enterprise policy. More generally, the technique herein provides for an enhanced network activity and user behavior analytics system that can detect insider threats, helping security analysts detect anomalous or malicious behaviors that occur on the network.

This subject matter may be implemented in whole or in part as-a-service. The machine learning (ML) functionality may be provided as a standalone function, or it may leverage functionality from other ML-based products and services.

In a typical use case, a SIEM or other security system has associated therewith a user interface that can be used to render the alert visually, to search and retrieve relevant information from alert database, and to perform other known input and output functions with respect thereto.

As noted above, the approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., access control systems and methods, other security systems, as well as improvements to automation-based cybersecurity analytics.

Having described the invention, what we claim is as follows:

1. A method for access control in a computing environment in which clients interact with an application deploying one or more non-authenticating endpoints to which application programming interface (API)-based requests are directed, comprising:
    responsive to receipt of an API access request from an unauthenticated client, applying a classifier to the API access request, the classifier having been generated by training a neural network according to a policy to distinguish at least first and second classes of behavior with respect to programmatic access to the one or more non-authenticating endpoints, the first class of behavior designated in the policy as appropriate activity initiated in a permitted context of the application and representing API requests accessing the non-authenticating API endpoints, and the second class of behavior designated in the policy as inappropriate activity initiated outside of the permitted context and representing API requests accessing the non-authenticating API endpoints;
    upon a determination by the classifier that the API access request from the unauthenticated client is within the first class of behavior, allowing the API access request; and
    upon a determination by the classifier that the API access request from the unauthenticated client is within the second class of behavior, taking a given action.

2. The method as described in claim 1, further including training the neural network classifier.

3. The method as described in claim 2, wherein training the neural network classifier includes defining a feature set comprising a set of elements representing a set of non-authenticating endpoints associated with a particular API access request from a client.

4. The method as described in claim 3, wherein an endpoint is defined with respect to a given time window, and wherein the element associated with the non-authenticating endpoint is assigned a value that represents appropriate activity or inappropriate activity.

5. The method as described in claim 4, wherein the feature set is derived from log data associated with API access requests that were found to be allowed, wherein the neural network classifier associates the feature set with appropriate activity.

6. The method as described in claim 4, wherein the feature set is derived by simulating at least some endpoint values as violating the policy, wherein the neural network classifier associates the feature set with inappropriate activity.

7. The method as described in claim 1, wherein the API is a RESTful API.

8. The method as described in claim 1, wherein the given action is one of: permitting the API access request, blocking the API access request, initiating an audit operation associated with permitting or blocking the API access request, and blacklisting the unauthenticated client.

9. An apparatus, comprising:
a hardware processor; and
computer memory holding computer program instructions executed by the hardware processor for access control in a computing environment in which clients interact with an application deploying one or more non-authenticating endpoints to which application programming interface (API)-based requests are directed, the computer program instructions configured to:
responsive to receipt of an API access request from an unauthenticated client, apply a classifier to the API access request, the classifier having been generated by training a neural network according to a policy to distinguish at least first and second classes of behavior with respect to programmatic access to the one or more unauthenticated endpoints, the first class of behavior designated in the policy as appropriate activity initiated in a permitted context of the application and representing API requests accessing API endpoints, and the second class of behavior designated in the policy as inappropriate activity initiated outside of the permitted context and representing API requests accessing the API endpoints;
upon a determination by the classifier that the API access request from the unauthenticated client is within the first class of behavior, allow the API access request; and
upon a determination by the classifier that the API access request from the unauthenticated client is within the second class of behavior, take a given action.

10. The apparatus as described in claim 9, wherein the computer program instructions are further configured to train the neural network classifier.

11. The apparatus as described in claim 9, wherein the API is a RESTful API.

12. The apparatus as described in claim 9, wherein the computer program instructions are further configured to take the given action that is one of: permitting the API access request, blocking the API access request, initiating an audit operation associated with permitting or blocking the API access request, and blacklisting the unauthenticated client.

13. A computer program product in a non-transitory computer readable medium for access control in a computing environment in which clients interact with an application deploying one or more non-authenticating endpoints to which application programming interface (API)-based requests are directed, the computer program product holding computer program instructions that, when executed by a data processing system, is configured to:
responsive to receipt of an API access request from an unauthenticated client, apply a classifier to the API access request, the classifier having been generated by training a neural network according to a policy to distinguish at least first and second classes of behavior with respect to programmatic access to the one or more unauthenticated endpoints, the first class of behavior designated in the policy as appropriate activity initiated in a permitted context of the application and representing API requests accessing API endpoints, and the second class of behavior designated in the policy as inappropriate activity initiated outside of the permitted context and representing API requests accessing the API endpoints;
upon a determination by the classifier that the API access request from the unauthenticated client is within the first class of behavior, allow the API access request; and
upon a determination by the classifier that the API access request from the unauthenticated client is within the second class of behavior, take a given action.

14. The computer program product as described in claim 13, wherein the computer program instructions are further configured to train the neural network classifier.

15. The computer program product as described in claim 14, wherein the computer program instructions are further configured to define a feature set comprising a set of non-authenticating elements representing a set of endpoints associated with a particular API access request from a client.

16. The computer program product as described in claim 15, wherein an endpoint is defined with respect to a given time window, and wherein the element associated with the non-authenticating endpoint is assigned a value that represents appropriate activity or inappropriate activity.

17. The computer program product as described in claim 16, wherein the feature set is derived from log data associated with API access requests that were found to be allowed, wherein the neural network classifier associates the feature set with appropriate activity.

18. The computer program product as described in claim 17, wherein the feature set is derived by simulating at least some endpoint values as violating the policy, wherein the neural network classifier associates the feature set with inappropriate activity.

19. The apparatus as described in claim 14, wherein the computer program instructions are further configured to define a feature set comprising a set of elements representing a set of non-authenticating endpoints associated with a particular API access request from a client.

20. The apparatus as described in claim 19, wherein an endpoint is defined with respect to a given time window, and wherein the element associated with the non-authenticating endpoint is assigned a value that represents appropriate activity or inappropriate activity.

21. The apparatus as described in claim 20, wherein the feature set is derived from log data associated with API access requests that were found to be allowed, wherein the neural network classifier associates the feature set with appropriate activity.

22. The apparatus as described in claim 20, wherein the feature set is derived by simulating at least some endpoint values as violating the policy, wherein the neural network classifier associates the feature set with inappropriate activity.

23. The computer program product as described in claim 13, wherein the API is a RESTful API.

24. The computer program product as described in claim 13, wherein the computer program instructions are further configured to take the given action that is one of: permitting the API access request, blocking the API access request, initiating an audit operation associated with permitting or blocking the API access request, and blacklisting the unauthenticated client.

25. Software-as-a-service implemented in a network-accessible cloud compute infrastructure comprising hardware and software, comprising:
   a network-accessible application;
   a neural network deployed in association with a set of non-authenticating endpoints that are accessible via an application program interface (API) by an unauthenticated client seeking access to the network-accessible application, the neural network trained according to a policy to distinguish at least first and second classes of behavior with respect to programmatic access to the one or more non-authenticating endpoints, the first class of behavior initiated in a permitted context of the network-accessible application and representing API requests accessing the non-authenticating API endpoints, and the second class of behavior initiated outside of the permitted context and representing API requests accessing the non-authenticating API endpoints;
   a service, responsive to receipt of a plurality of interface access requests to the network-accessible application during a given time period, to apply the neural network to make a determination whether the plurality of interface access requests satisfy the permitted context, and to apply an access control based on the determination.

* * * * *